(12) United States Patent
Pasi et al.

(10) Patent No.: US 8,779,623 B2
(45) Date of Patent: Jul. 15, 2014

(54) CABLE BUS

(75) Inventors: Siddika Pasi, Kendall Park, NJ (US); Kristian Van Derzee, Verona, NJ (US)

(73) Assignee: First Solar, Inc., Perrysburg, OH (US)

( * ) Notice: Subject to any disclaimer, the term of this patent is extended or adjusted under 35 U.S.C. 154(b) by 647 days.

(21) Appl. No.: 12/969,049

(22) Filed: Dec. 15, 2010

(65) Prior Publication Data

US 2011/0140528 A1 Jun. 16, 2011

Related U.S. Application Data

(60) Provisional application No. 61/286,426, filed on Dec. 15, 2009.

(51) Int. Cl.
*H02J 1/00* (2006.01)

(52) U.S. Cl.
USPC ............ 307/11; 307/18; 307/43; 307/82; 439/468; 439/505; 710/316

(58) Field of Classification Search
USPC .............. 307/11, 18, 43, 82, 78, 77; 136/244; 363/95
See application file for complete search history.

(56) References Cited

U.S. PATENT DOCUMENTS

| | | | |
|---|---|---|---|
| 7,442,077 B2 * | 10/2008 | Peress et al. ................. | 439/505 |
| 2004/0147172 A1 | 7/2004 | Brown et al. | |
| 2004/0211456 A1 | 10/2004 | Brown et al. | |
| 2007/0193618 A1 * | 8/2007 | Bressler et al. ............... | 136/244 |
| 2008/0099062 A1 | 5/2008 | Armstrong et al. | |
| 2008/0238195 A1 * | 10/2008 | Shaver et al. .................. | 307/18 |
| 2009/0119440 A1 * | 5/2009 | Ban et al. ...................... | 710/316 |

FOREIGN PATENT DOCUMENTS

WO WO 2009/076740 A1 6/2009

* cited by examiner

*Primary Examiner* — Rexford Barnie
*Assistant Examiner* — Jagdeep Dhillon
(74) *Attorney, Agent, or Firm* — Dickstein Shapiro LLP

(57) ABSTRACT

A photovoltaic array cable bus system can include a cable bus and at least one electrical connector.

23 Claims, 10 Drawing Sheets

A - A

B - B

C - C

D - D

CABLE BUS

CLAIM OF PRIORITY

This application claims priority to U.S. Provisional Patent Application No. 61/286,426, filed on Dec. 15, 2009, which is incorporated by reference in its entirety.

TECHNICAL FIELD

This invention relates to a photovoltaic array cable bus system. The photovoltaic array cable bus system can include a cable bus and at least one electrical connector.

BACKGROUND

Electrical wiring is used to connect photovoltaic modules to form photovoltaic arrays. Assembling a photovoltaic array on-site can be time-consuming and costly.

DETAILED DESCRIPTION

Figure 1:
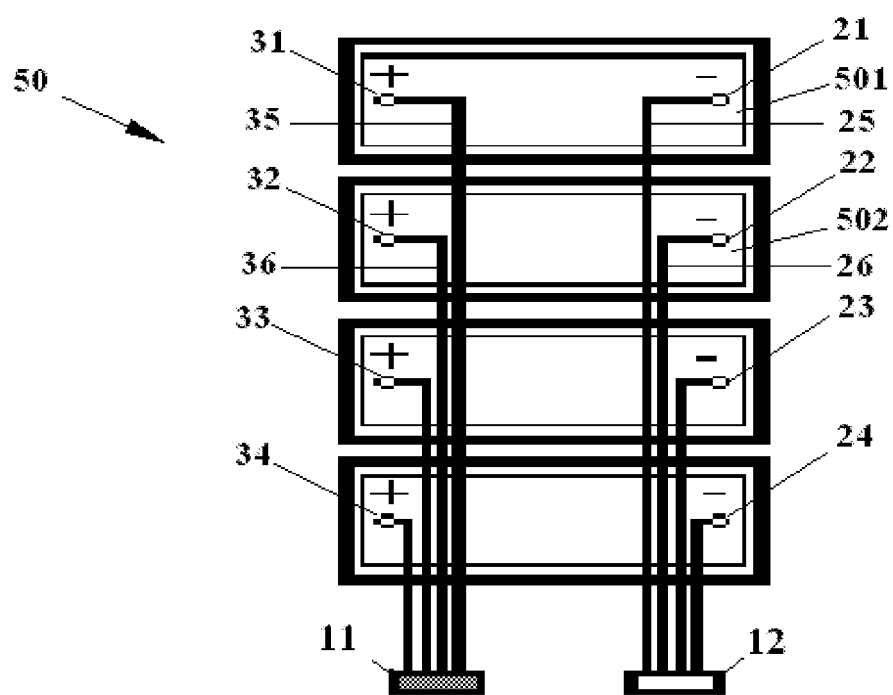
FIG. 1 illustrates a photovoltaic cartridge.

Electrical harnesses can be used to electrically connect in parallel the strings of photovoltaic modules within an array. Multiple harnesses from the adjacent rows can be further connected in parallel together within a combined box. The summation of multiple string currents is then fed through a large single feeder to the inverter. However, the large currents feeding over long distances can result in large voltage drops. Furthermore, the onsite installation can be labor intensive.

A photovoltaic array can include photovoltaic cartridges which can include multiple photovoltaic modules. The modules can be physically and/or electrically connected in advance before being transported to the site of the photovoltaic array. Electrical connections between photovoltaic cartridges themselves and between photovoltaic cartridges and a cable bus can be made by using matching clips having corresponding mating connectors. In this way, any suitable photovoltaic installation can be assembled at a substantial time and cost savings. Additionally, compared to conventional connection methods and layouts, the photovoltaic array cable bus system can decrease the effect of voltage drop or lengthy cables with high ampacity. An in-line device such as an in-line fuse module can eliminate or reduce the need for container boxes.

A photovoltaic cartridge can include a first photovoltaic module. The first photovoltaic module can include a first conductor electrically connected to a first terminal of a first polarity of the first photovoltaic module, which can be either positive or negative. The first conductor can include a first conductor clip end. The cartridge can include a second photovoltaic module. The second photovoltaic module can include a second conductor electrically connected to a second terminal of the first polarity of the second photovoltaic module. The first polarity of the second photovoltaic module is the same as the first polarity of the first photovoltaic module. The second conductor can include a second conductor clip end. The cartridge can include a cartridge clip including a body. The cartridge clip can include a first mating connector which can be electrically connected to the first conductor clip end. The cartridge clip can include a second mating connector which can be electrically connected to the second conductor clip end.

The cartridge clip can be configured to mate to a corresponding cable bus clip to connect the first conductor and the second conductor to a cable bus. The photovoltaic cartridge can further include a third conductor electrically connected to a first terminal of the second polarity of the first photovoltaic module. The third conductor can include a third conductor clip end. The cartridge can include a fourth conductor electrically connected to a second terminal of the second polarity of the second photovoltaic module. The fourth conductor can include a fourth conductor clip end. The cartridge can include a second cartridge clip comprising a body. The second cartridge clip can include a third mating connector electrically connected to the third conductor clip. The second cartridge clip can include a fourth mating connector electrically connected to the fourth conductor clip end.

The photovoltaic module cartridge can include a third photovoltaic module. The third photovoltaic module can include a third conductor electrically connected to a first terminal of the second polarity of the third photovoltaic module. The third conductor can include a third conductor clip end. The photovoltaic module cartridge can include a fourth photovoltaic module. The fourth photovoltaic module can include a fourth conductor electrically connected to a second terminal of the second polarity of the fourth photovoltaic module. The fourth conductor can include a fourth conductor terminal end and a fourth conductor clip end. The cartridge can include a second cartridge clip comprising a body. The second cartridge clip can include a third mating connector electrically connected to the third conductor clip, and a fourth mating connector electrically connected to the fourth conductor clip end.

The first photovoltaic module and third photovoltaic module can be connected in series. The second photovoltaic module and fourth photovoltaic module can be connected in series. The series connection between the first photovoltaic module and the third photovoltaic module can include a fifth photovoltaic module connected in series.

A photovoltaic array can include a first photovoltaic cartridge. The first photovoltaic cartridge can include a first photovoltaic module. The first photovoltaic module can include a first conductor electrically connected to a first terminal of a first polarity of the first photovoltaic module. The first polarity can be either positive or negative. The first conductor can include a first conductor clip end. The first photovoltaic cartridge can include a second photovoltaic module. The second photovoltaic module can include a second conductor electrically connected to a second terminal of the first polarity, which is the same as the first polarity of the first photovoltaic module. The second conductor can include a second conductor clip end. The cartridge can include a first cartridge clip including a body. The first cartridge clip can include a first mating connector which can be electrically connected to the first conductor clip end. The first cartridge clip can include a second mating connector which can be electrically connected to the second conductor clip end.

The photovoltaic array can include a second photovoltaic cartridge. The second photovoltaic cartridge can include a third photovoltaic module. The third photovoltaic module can include a third conductor electrically connected to a first terminal of the second polarity of the third photovoltaic module. The second polarity is the opposite of the first polarity of the first photovoltaic module. The third conductor can include a third conductor clip end. The second photovoltaic cartridge can include a fourth photovoltaic module. The fourth photovoltaic module can include a fourth conductor electrically connected to a second terminal of the second polarity, which is the same polarity as the second polarity of the third photovoltaic module. The fourth conductor can include a fourth conductor clip end. The second photovoltaic cartridge can include a second cartridge clip including a body. The second cartridge clip can include a third mating connector which can be electrically connected to the third conductor clip end. The second photovoltaic cartridge clip can include a fourth mating connector which can be electrically connected to the fourth conductor clip end. The first cartridge clip can be mated to the second cartridge clip to connect in series the first photovoltaic module with the third photovoltaic module and to connect in series the second photovoltaic module to the fourth photovoltaic module.

The photovoltaic array can further include a first plurality of conductors each electrically connected to a terminal of the second polarity in the first photovoltaic cartridge. The photovoltaic array can include a third cartridge clip including a body and a first plurality of mating connectors each electrically connected to one of the first plurality of conductors electrically connected to a terminal of the second polarity. The photovoltaic array can include a second plurality of conductors each electrically connected to a terminal of the first polarity in the second photovoltaic cartridge. The photovoltaic array can include a fourth cartridge clip including a body and a second plurality of mating connectors each electrically connected to one of the second plurality of conductors electrically connected to a terminal of the first polarity.

The photovoltaic array can include a cable bus configured to be connected to the first and second photovoltaic cartridges. The cable bus can include a first cable bus clip which can include a body and a plurality of mating connectors. The first cable bus can be configured to connect to the third cartridge clip. The cable bus can include a second cable bus clip which can include a body and a plurality of mating connectors. The second cable bus clip can be configured to connect to the fourth cartridge clip. In this way, the first and second photovoltaic cartridges can be connected to the cable bus.

The photovoltaic array can include an in-line fuse module which can include a plurality of fuses configured to be connected in-line between the first cable bus clip and the third cartridge clip. The photovoltaic array can include an in-line test module including a plurality of indicators configured to be connected in-line between the first cable bus clip and the third cartridge clip and to indicate whether the conductors electrically connected to mating connectors in the third cartridge clip are electrically connected to the cable bus. The photovoltaic array can include an in-line measuring device configured to be connected in-line between the first cable bus clip and the third cartridge clip and to measuring a current-voltage characteristic at the connection between the conductors electrically connected to mating connectors in the third cartridge clip and the cable bus. The photovoltaic array can include a radio transmitter transmitting a measured current-voltage characteristic from the in-line measuring device for remote monitoring.

A method of constructing a photovoltaic array can include connecting a photovoltaic cartridge to a cable bus. The photovoltaic cartridge can include a cartridge clip. The cartridge clip can include a body and a plurality of mating connectors each electrically connected to a conductor of a first polarity. The step of connecting the photovoltaic cartridge to the cable bus can include connecting the cartridge clip to a cable bus clip including a body and a plurality of mating connectors configured to electrically connect to the mating connectors of the cartridge clip.

The method can include the step of connecting a fuse module including a plurality of fuses in-line between the cartridge clip and the cable bus clip. The method can include connecting a test module in-line between the cartridge clip and the cable bus clip, wherein the test module is configured to indicate whether the conductors electrically connected to mating connectors in the cartridge clip are electrically connected to the cable bus. The method can include connecting a measuring device in-line between the cartridge clip and the cable bus clip, wherein the measuring device is configured to measure a current-voltage characteristic at the connection between the conductors electrically connected to mating connectors in the cartridge clip and the cable bus.

Referring to FIG. 1, a photovoltaic cartridge 50 can include one column of four photovoltaic modules, each module including a positive terminal and a negative terminal. Each terminal is electrically connected to a conductor, such as a wire. Therefore, photovoltaic cartridge 50 can include four positive wires and four negative wires. The four positive wires can be harnessed together, terminating in a cartridge clip and the four negative wires can be harnessed together, terminating in another cartridge clip. As a result, the photovoltaic modules can be physically connected and prewired off-site before the photovoltaic array is assembled.

As shown in FIG. 1, module 501 of photovoltaic cartridge 50 includes positive terminal 31 and negative terminal 21. Module 502 includes positive terminal 32 and negative terminal 22. Terminals 31, 32, 21, and 22 are electrically connected to conductors 35, 36, 25, and 26, respectively. The positive conductors 35, 36 are electrically connected to positive terminals 31, 32, respectively, at one end. The other end of each of conductors 35, 36 includes a conductor clip end, each of which can be connected to a cartridge clip 11. Cartridge clip 11 can include a body, a mating connector electrically connected to the conductor clip end of conductor 35 and a mating connector electrically connected to the conductor clip end of conductor 36. (see FIGS. 6, 6A, 6B.) Similarly, negative conductors 25, 26 are electrically connected to negative terminals 21, 22, respectively, at one end. The other end of each of conductors 25, 26 includes a conductor clip end, each of which can be connected to a cartridge clip 12. Cartridge clip 12 can include a body, a mating connector electrically connected to the conductor clip end of conductor 25 and a mating connector electrically connected to the conductor clip end of conductor 26. (See FIGS. 7, 7A, 7B.) Photovoltaic cartridge 50 can be assembled in any suitable manner or location. For example, photovoltaic cartridge 50 can be assembled at a factory before shipping to a photovoltaic array construction site.

Figure 2:
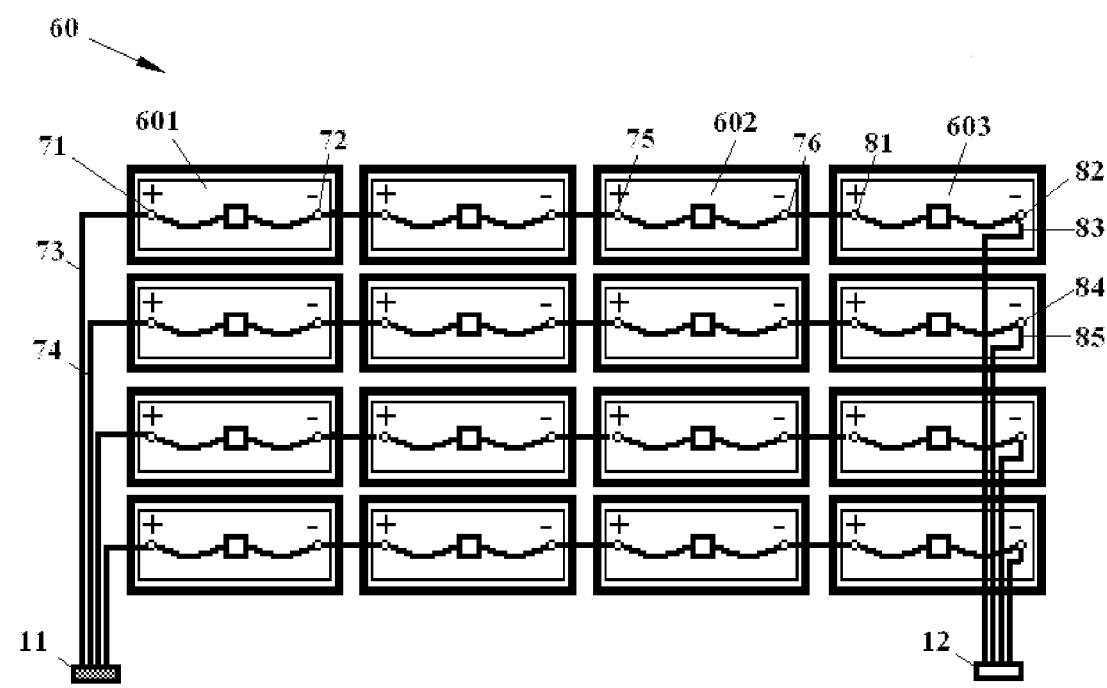
FIG. 2 illustrates a photovoltaic cartridge.

Referring to FIG. 2, a second embodiment of a photovoltaic cartridge 60 can include more than four rows of single, electrically unconnected photovoltaic modules. As shown in FIG. 2, photovoltaic cartridge 60 can include four rows of four series electrically connected photovoltaic modules. Module 601 includes positive terminal 71 and negative terminal 72. Positive conductor 73 is electrically connected to positive terminal 71. As in photovoltaic cartridge 50 of FIG. 1, positive conductor 73 is connected to a cartridge clip 11 at a conductor clip end of conductor 73, along with other positive conductors, such as conductor 74, which is electrically connected to a positive terminal of a second photovoltaic module. As shown in FIG. 2, negative terminal 72 (and the other negative terminals of the modules whose positive conductors 73, 74 are connected to cartridge clip 11) can be connected to a positive terminal of another photovoltaic module, the negative terminal of which can be connected to the positive terminal 75 of photovoltaic module 602, to form a series connection of photovoltaic modules. FIG. 2 shows four rows of four series-connected photovoltaic modules. The first row include end modules 601 and 603, interior module 602 adjacent to end module 603, and another interior module connected in series between modules 601 and 602. The first row series can include a connection between negative terminal 76 of module 602 and positive terminal 81 of module 603. Negative conductor 83 is electrically connected to negative terminal 82 and connected to cartridge clip 12 at a conductor clip end of conductor 83. Likewise, the negative conductors electrically attached to the negative terminals of the other similarly situated end modules are connected to cartridge clip 12. For example, negative conductor 85 electrically connected to negative terminal 84 is connected to cartridge clip 12 at the conductor clip end of conductor 85.

FIGS. 1 and 2 show two exemplary photovoltaic module cartridges. Other cartridges can include any suitable number and configuration of modules and any suitable types of connections for building the desired photovoltaic cartridge or array. Photovoltaic modules within a cartridge can be connected in parallel or in series, or both, as suitable for the desired application.

Figure 3:
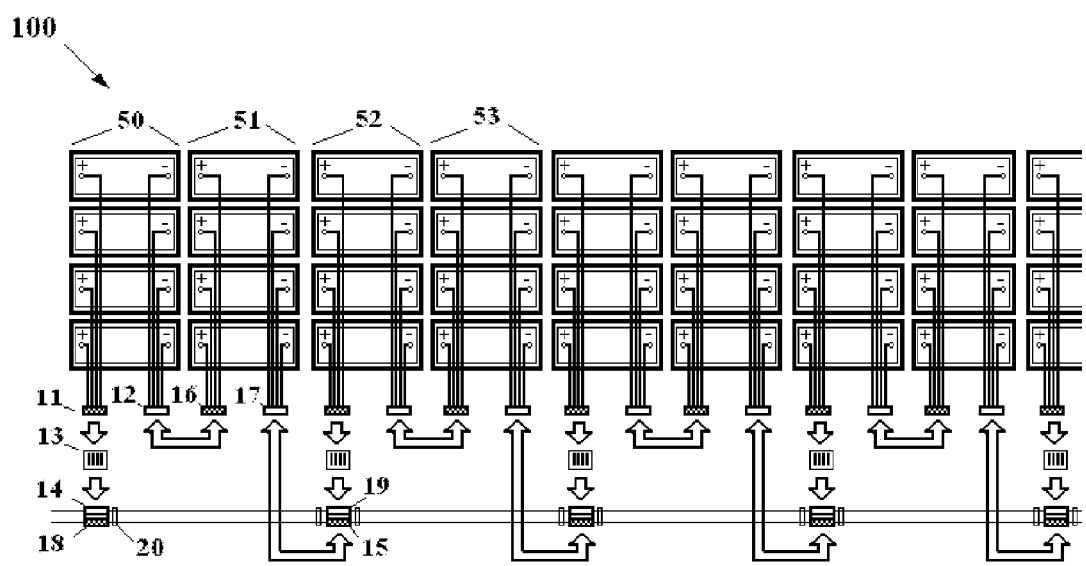
FIG. 3 illustrates a photovoltaic array including a photovoltaic cartridge and a cable bus.

FIG. 3 shows a photovoltaic array 100 including four rows of eight complete photovoltaic modules. The photovoltaic array 100 includes eight photovoltaic cartridges of four modules each, including cartridges 50, 51, 52, and 53, each of which is configured as cartridge 50 is shown in FIG. 1. Photovoltaic array 100 includes the cable bus including cable bus clips 14, 15, 18, and 19. The cartridges can be connected to the cable bus (and to each other) by mating corresponding clips (which can mate by coupling corresponding, e.g., male and female, mating connectors). For example, as shown in FIG. 3, the positive terminals of cartridge 50 connected to cartridge clip 11 are connected to the cable bus through cable bus clip 14. Cartridge clip 11 is capable of mating with cable bus clip 14 through mating connectors in each of the clips. Optionally, an in-line device 13 can be mated on one end to cartridge clip 11 and on the other end to cable bus clip 14. In-line device 13 can be any suitable in-line device. See, e.g., FIGS. 8, 8A, described below.

Still referring to FIG. 3, cartridge 50 can be connected to another cartridge 51. Cartridge clip 12 of cartridge 50 is connected by four conductors, such as four wires, to the four negative module terminals in cartridge 50. Each terminal is electrically connected to a conductor and each of the conductors is electrically connected to a mating connector in cartridge clip 12. Cartridge clip 12 can be mated to cartridge clip 16 of cartridge 51 which can include mating connectors configured to mate to the mating connectors in cartridge clip 12.

The mating connectors in cartridge clip 16 can be electrically connected to conductors that can be electrically connected to the positive terminals of the modules in cartridge 51. Mating cartridge clip 12 to cartridge clip 16 can include mating each of four corresponding mating connector pairs. As a result, mating cartridge clip 12 and cartridge clip 16 can result in four rows of two series-connected modules each in a photovoltaic cartridge-pair include cartridges 50 and 51, for example.

As shown in FIG. 3, the electrical connection of the cartridge-pair including cartridges 50 and 51 to the cable bus can be completed by electrically connecting the negative terminals of the modules in cartridge 51 to the cable bus. The negative terminals are electrically connected to corresponding conductors, each of which includes a conductor clip end. Each conductor clip end is electrically connected to a mating connector included in cartridge clip 17. Cartridge clip 17 can be mated to cable bus clip 15, by mating the mating connectors included in cartridge clip 17 to corresponding mating connectors in cable bus clip 15. In this way, the photovoltaic cartridge-pair including cartridges 50 and 51 connected in series can be electrically connected into the cable bus, allowing the electricity generated in the photovoltaic modules to power an electrical draw, such as an electrical grid. Photovoltaic cartridges 52 and 53 can be paired to each other and connected to the cable bus in a manner similar to cartridges 50 and 51. As shown in FIG. 3, the result is two cartridge-pairs connected to the cable bus in parallel. It should be noted that it is not necessary to pair cartridges. For example, each of cartridges 50, 51, 52, and 53 could be electrically connected to the cable bus at both the positive cartridge clip (e.g. 11) and the negative cartridge clip (e.g., 12). As a result, cartridges 50, 51, 52, and 53 can be connected to the cable bus in parallel. A photovoltaic array can include any suitable number of cartridges including any suitable number of modules and connected in any suitable manner.

Figure 4:
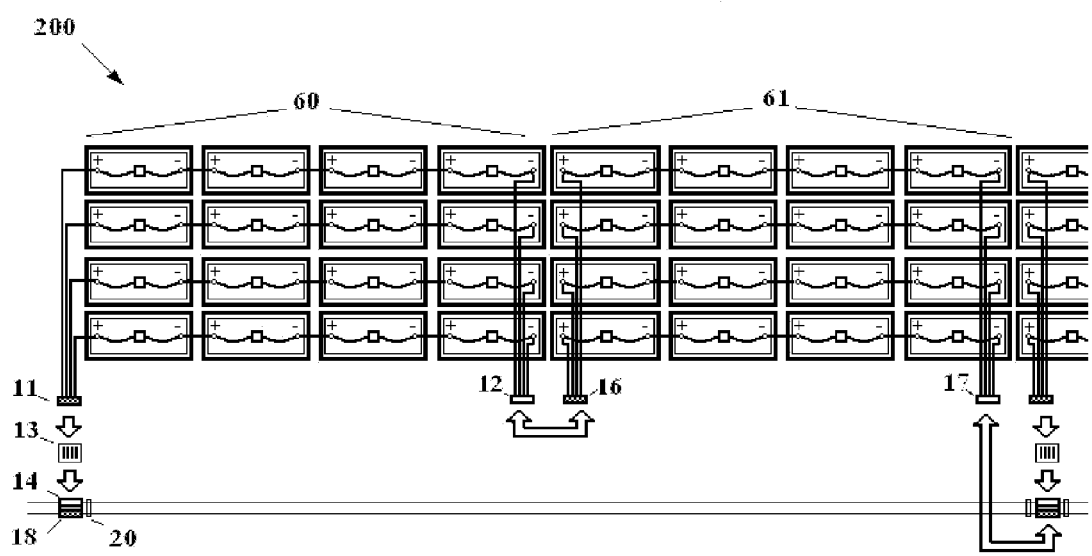
FIG. 4 illustrates a photovoltaic array including a photovoltaic cartridge and a cable bus.

Referring to FIG. 4, a photovoltaic array includes two photovoltaic cartridges 60 and 61 configured in a manner similar to photovoltaic cartridge 60 of FIG. 2. Each cartridge includes four rows of four series-connected photovoltaic modules. Cartridges 60 and 61 are coupled to form a cartridge-pair by mating cartridge clips 12 and 16. Cartridge 60 is electrically connected to the cable bus by mating cartridge clip 11 to cartridge clip 14 (in this case through in-line device 13. Cartridge 61 is electrically connected to the cable bus by mating cartridge clip 17 to a cable bus clip including mating connectors electrically connected to the cable bus.

Figure 5:
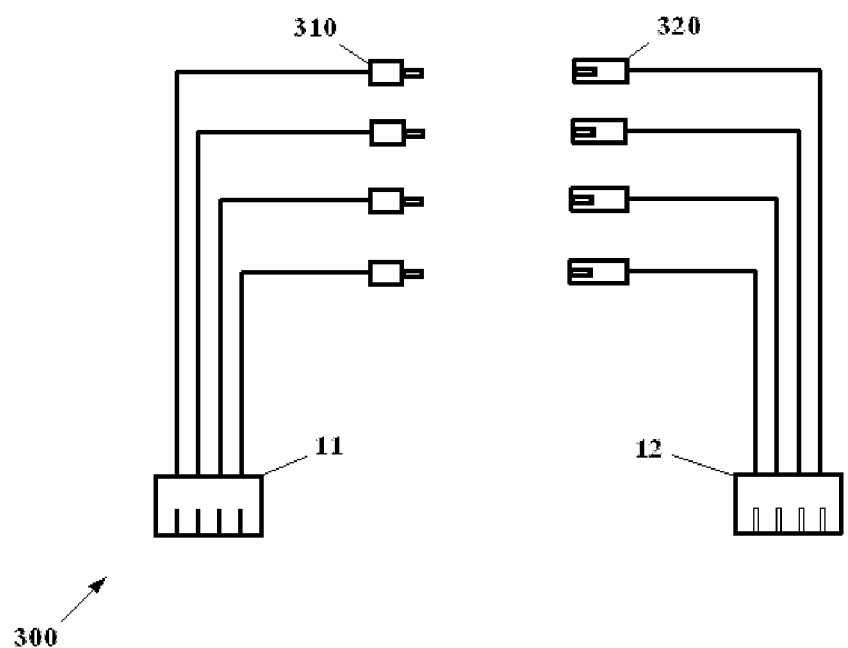
FIG. 5 illustrates a photovoltaic cartridge harness layout.

As shown in FIG. 5, pair 300 of cartridge clips 11 and 12 can be connected to a number of conductors, each of which is configured to be connected to a positive or negative terminal of a photovoltaic module. As shown in FIG. 1-4, cartridge clip 11 can be a positive cartridge clip connected to four conductors, each electrically connected to a positive terminal of a photovoltaic module. Cartridge clip 12 can be a negative cartridge clip connected to fourth conductors which are each electrically connected to a negative terminal of a photovoltaic module. A conductor can be electrically connected to a photovoltaic module terminal in any suitable manner. For example, a conductor can include a terminal connector 310, 320 at a terminal end of the conductor. The terminal connector can be a mating connector designed to mate with a corresponding connector at the terminal. For example, a positive conductor connected to cartridge clip 11 can include a male terminal connector 310 configured to connect to a female terminal connector similar to 320 in electrical connection to the positive terminal. The conductors can be electrically connected to the terminals in any other suitable manner, including soldering, crimping, clamping, clipping, or any other suitable method. In some embodiments, the photovoltaic array cable bus system can include a photovoltaic cartridge harness layout.

Figure 6:
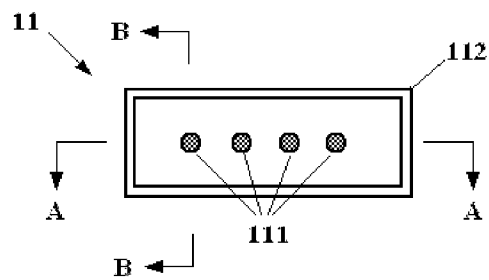
FIG. 6 illustrates a photovoltaic connector.
Figure 6A:
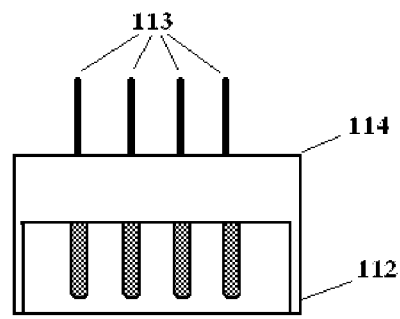
FIG. 6A illustrates a cross section of the photovoltaic connector along line A-A.
Figure 6B:
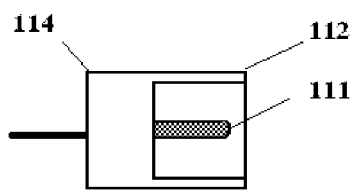
FIG. 6B illustrates a cross section of the photovoltaic connector along line B-B.
Figure 7:
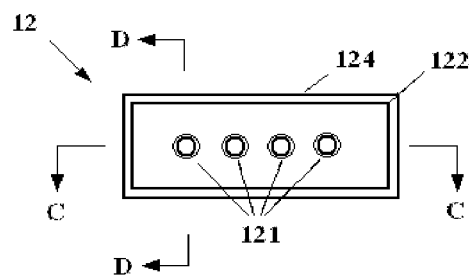
FIG. 7 illustrates a connector.
Figure 7A:
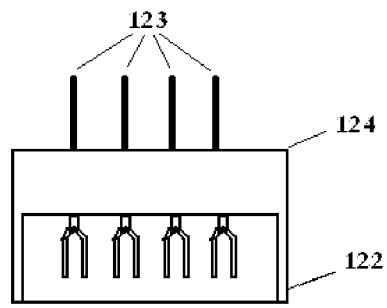
FIG. 7A illustrates a cross section of the connector along line C-C.
Figure 7B:
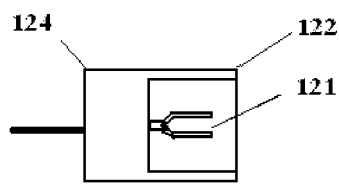
FIG. 7B illustrates a cross section of the connector along line D-D.

As shown in FIG. 6 cartridge clip 11 can include four male mating connectors 111. As shown in FIG. 6A, each male mating connector can be electrically connected to a conductor 113 (which is electrically connected to a module terminal, such as a positive terminal). Cartridge clip 11 can include body 114 including shield 112. Cartridge body 114 can have any suitable configuration and male mating connectors 111 can have any suitable configuration or orientation. Cartridge clip 11, body 114, and male mating connectors 111 can be configured to allow cartridge clip 11 and/or male mating connectors 111 to couple or mate with a corresponding cartridge clip (e.g., 14 in FIG. 3) having corresponding, compatible mating connectors, such as female mating connectors. FIGS. 7, 7A, and 7B show cartridge clip 12, which can include body 124 having shield 122 and female mating connectors 121 which can correspond to and be compatible with male mating connectors 111 of cartridge clip 11 shown in FIG. 6, such that when cartridge clip 11 is coupled or mated to a clip having the configuration of cartridge clip 12 (e.g., cable bus clip 14 in FIG. 3), an electrical connection is established between one or more of conductors 113 electrically connected to cartridge clip 11 and one or more of conductors 121 electrically connected to cartridge clip 12 (or, e.g., similarly configured cable bus clip 14).

Figure 8:
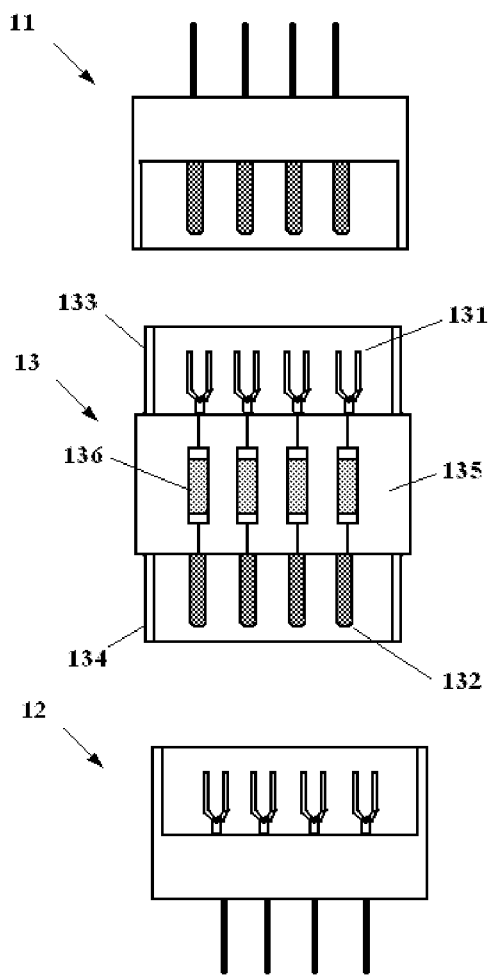
FIG. 8 illustrates a cross section of the connectors and an in-line fuse block.
Figure 8A:
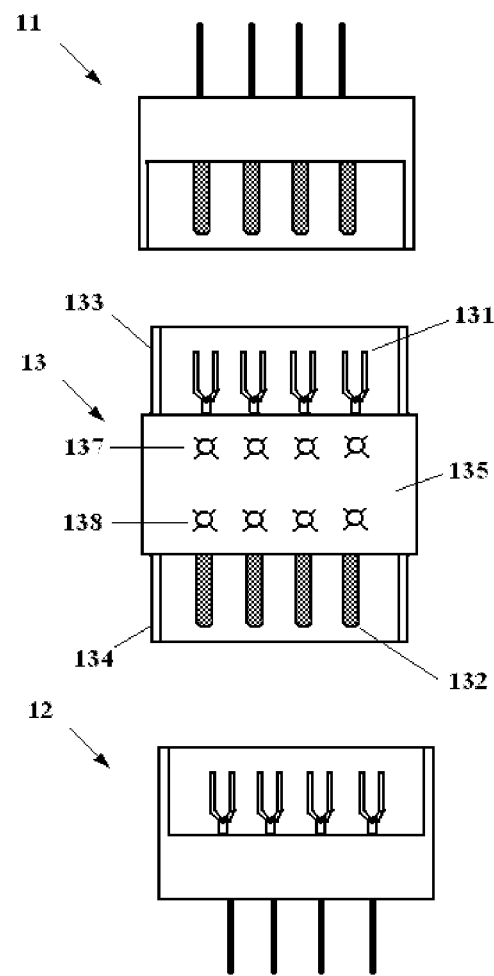
FIG. 8A illustrates a cross section of the connectors and an in-line testing device.
Figure 9:
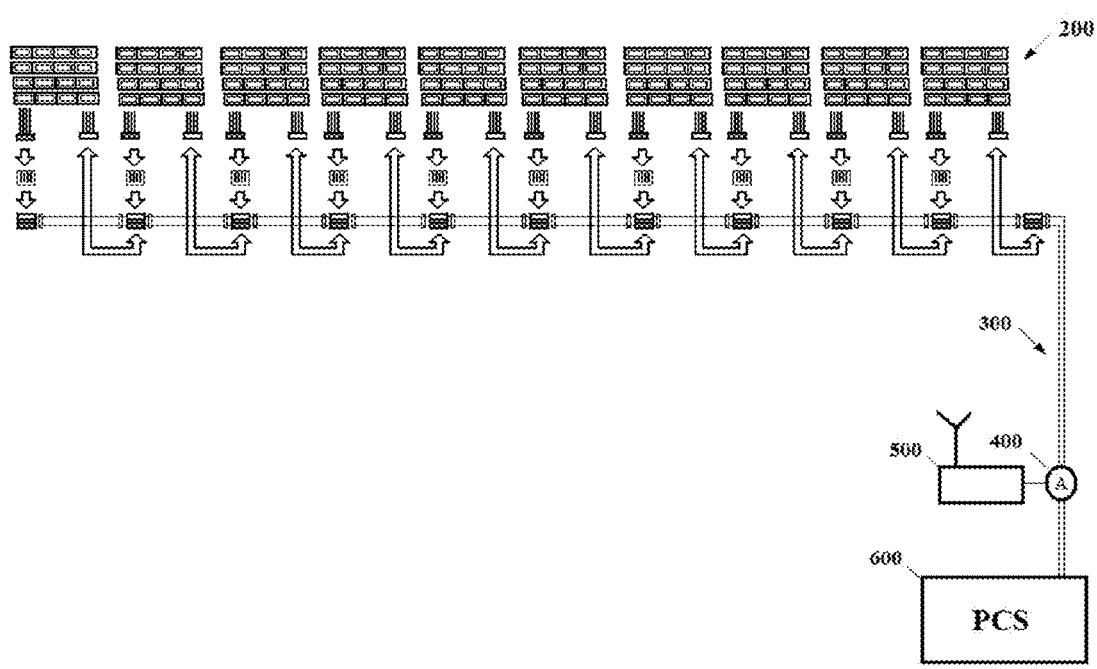
FIG. 9 illustrates a photovoltaic array.

As shown in FIG. 8, in-line device 13 can be inserted between cartridge clip 11 and cartridge clip 12, or similarly configured cable bus clip 14, as shown if FIG. 3. In-line device 13 can include a plurality of female mating connectors 131 configured to mate to the male mating connectors in cartridge clip 11 and a plurality of male mating connectors 132 configured to connect to the female mating connectors in cartridge clip 12, or a similarly configured cable bus clip. The conductor between each of female mating connectors 131 and male mating connectors 132 can include any suitable testing, control, measurement, or safety component or circuitry. For example, in-line device 13 can include a fuse block 135 including a plurality of fuses 136. In-line device 13 can include body members 133, 134 which can be configured to couple with corresponding cartridge and/or cable bus clips. As shown in FIG. 8A, in-line device 13 can include indicator lights 137, 138 which can indicate a status of the connections between cartridge clip 11 and cartridge clip 12 or a similarly configured cable bus clip. For example, indicator lights 137, 138 can indicate continuity of the electrical connections, or that a threshold voltage is present at the connection. Indicator light 137 can be a colored light (such as a green light) indicating a positive status (e.g., continuity of the connection or a sufficient voltage). Indicator light 138 can be a color light (such as a red light) indicating a negative status. In-line device 13 can also include a measurement device to measure one or more current-voltage characteristics at the connections.

As shown in FIG. 8, a photovoltaic array 200 can include a plurality of photovoltaic cartridges. Cable bus 300 can be included to collect generated currents. Cable bus 300 can include two conductors. In-line current measuring device 400 and radio transmitter 500 transmitting the measured current value from in-line current measuring device 400 can be included for remote monitoring. In-line current measuring device 400 and radio transmitter 500 can also be further included with in-line fuse module (13 in FIG. 7) to monitor the output current from each module cartridge. Cable bus 300 can be further connected to power conversion station 600 to real time monitor and control the operation of the photovoltaic array. Current measuring device 400 and radio transmitter 500 can be connected to a data acquisition system, which can be located within a shelter associated with power conversion station 600, or any other suitable location.

While the invention has been shown and explained in the embodiment described herein, it is to be understood that the invention should not be confined to the exact showing of the drawings, and that any variations, substitutions, and modifications are intended to be comprehended within the spirit of the invention. Other embodiments are within the claims.

What is claimed is:

1. A photovoltaic structure comprising:
    a photovoltaic cartridge comprising:
    a first photovoltaic module comprising a first conductor electrically connected to a first terminal of a first polarity of the first photovoltaic module, the first conductor including a first conductor clip end;
    a second photovoltaic module comprising a second conductor electrically connected to a second terminal of the first polarity of the second photovoltaic module, the second conductor including a second conductor clip end; and
    a cartridge clip comprising a body, a first mating connector electrically connected to the first conductor clip end, and a second mating connector electrically connected to the second conductor clip end; wherein the cartridge clip is configured to commonly electrically conduct charge of only the first polarity from said first and second photovoltaic modules.

2. The photovoltaic structure of claim 1, wherein the cartridge clip is configured to mate to a corresponding cable bus clip to electrically connect the first conductor and the second conductor to a cable bus.

3. The photovoltaic structure of claim 1, wherein the photovoltaic cartridge further comprises:
    a third conductor electrically connected to a first terminal of a second polarity of the first photovoltaic module, which is opposite of the first polarity, wherein the third conductor includes a third conductor clip end;
    a fourth conductor electrically connected to a second terminal of the second polarity of the second photovoltaic module, wherein the fourth conductor includes a fourth conductor clip end; and
    a second cartridge clip comprising a body, a third mating connector electrically connected to the third conductor clip end, and a fourth mating connector electrically connected to the fourth conductor clip end, wherein the second cartridge clip is configured to commonly electrically conduct charge of only the second polarity from the first and second photovoltaic modules.

4. The photovoltaic structure of claim 1, wherein the photovoltaic cartridge further comprises:
    a third photovoltaic module comprising a third conductor electrically connected to a first terminal of a second polarity of the third photovoltaic module, wherein the third conductor includes a third conductor clip end;
    a fourth photovoltaic module comprising a fourth conductor electrically connected to a second terminal of the second polarity of the fourth photovoltaic module, wherein the fourth conductor includes a fourth conductor clip end; and
    a second cartridge clip comprising a body, a third mating connector electrically connected to the third conductor clip, and a fourth mating connector electrically connected to the fourth conductor clip end, wherein the second cartridge clip is configured to commonly electrically conduct charge of only the second polarity from the third and fourth photovoltaic modules.

5. The photovoltaic structure of claim 4, wherein the first photovoltaic module and third photovoltaic module are connected in series.

6. The photovoltaic structure of claim 4, wherein the second photovoltaic module and fourth photovoltaic module are connected in series.

7. The photovoltaic structure of claim 6, wherein the series connection between the first photovoltaic module and the third photovoltaic module comprises a fifth photovoltaic module connected in series.

8. A photovoltaic array comprising:
a first photovoltaic cartridge comprising:
  a first photovoltaic module comprising a first conductor electrically connected to a first terminal of a first polarity of the first photovoltaic module, the first conductor including a first conductor clip end;
  a second photovoltaic module comprising a second conductor electrically connected to a second terminal of the first polarity of the second photovoltaic module, the second conductor including a second conductor clip end; and
  a cartridge clip comprising a body, a first mating connector electrically connected to the first conductor clip end, and a second mating connector electrically connected to the second conductor clip end;
a second photovoltaic cartridge comprising:
  a third photovoltaic module comprising a third conductor electrically connected to a first terminal of a second polarity of the third photovoltaic module, wherein the third conductor includes a third conductor clip end;
  a fourth photovoltaic module comprising a fourth conductor electrically connected to a second terminal of the second polarity of the fourth photovoltaic module, wherein the fourth conductor includes a fourth conductor clip end; and
  a second cartridge clip comprising a body, a third mating connector electrically connected to the third conductor clip, and a fourth mating connector electrically connected to the fourth conductor clip end;
wherein the first cartridge clip is connected to the second cartridge clip by mating connectors to connect in series the first photovoltaic module with the third photovoltaic module and to connect in series the second photovoltaic module to the fourth photovoltaic module.

9. The photovoltaic array of claim 8, further comprising:
a first plurality of conductors each electrically connected to a respective photovoltaic module terminal of the second polarity in the first photovoltaic cartridge;
a third cartridge clip comprising a body and a plurality of mating connectors each electrically connected to one of the plurality of conductors electrically connected to a respective photovoltaic module terminal of the second polarity in the first photovoltaic cartridge;
a second plurality of conductors each electrically connected to a respective photovoltaic module terminal of the first polarity in the second photovoltaic cartridge; and
a fourth cartridge clip comprising a body and a plurality of mating connectors each electrically connected to one of the plurality of conductors electrically connected to a respective photovoltaic module terminal of the first polarity in the second photovoltaic cartridge.

10. The photovoltaic array of claim 9, further comprising a cable bus configured to be connected to the first and second photovoltaic cartridges.

11. The photovoltaic array of claim 10, wherein the cable bus comprises a first cable bus clip comprising a body and a plurality of mating connectors and configured to connect to the third cartridge clip and a second cable bus clip comprising a body and a plurality of mating connectors and configured to connect to the fourth cartridge clip, to connect the first and second photovoltaic cartridges to the cable bus.

12. The photovoltaic array of claim 11, further comprising an in-line fuse module comprising a plurality of fuses configured to be connected in-line between the first cable bus clip and the third cartridge clip.

13. The photovoltaic array of claim 11, further comprising an in-line test module comprising a plurality of indicators configured to be connected in-line between the first cable bus clip and the third cartridge clip and to indicate whether the conductors electrically connected to mating connectors in the third cartridge clip are electrically connected to the cable bus.

14. The photovoltaic array of claim 11, further comprising an in-line measuring device configured to be connected in-line between the first cable bus clip and the third cartridge clip and to measuring a current-voltage characteristic at the connection between the conductors electrically connected to mating connectors in the third cartridge clip and the cable bus.

15. The photovoltaic array of claim 14, further comprising a radio transmitter transmitting a measured current-voltage characteristic from the in-line measuring device for remote monitoring.

16. A method of constructing a photovoltaic array comprising:
assembling a photovoltaic cartridge, wherein the assembling step comprises:
  connecting a first terminal of a first polarity of a first photovoltaic module to a first mating connector of a cartridge clip, wherein the cartridge clip comprises a body and a plurality of mating connectors; and
  connecting a first terminal of a first polarity of a second photovoltaic module to a second mating connector of the cartridge clip; wherein the cartridge clip is configured to commonly electrically conduct charge of only the first polarity from the first and second photovoltaic modules;
connecting the photovoltaic cartridge to a cable bus through the cartridge clip.

17. The method of claim 16, wherein the step of connecting the photovoltaic cartridge to the cable bus comprises connecting the cartridge clip to a cable bus clip comprising a body and a plurality of mating connectors configured to electrically connect to the mating connectors of the cartridge clip.

18. The method of claim 17, further comprising the step of connecting a fuse module comprising a plurality of fuses in-line between the cartridge clip and the cable bus clip.

19. The method of claim 17, further comprising connecting a test module in-line between the cartridge clip and the cable bus clip, wherein the test module is configured to indicate whether the conductors electrically connected to mating connectors in the cartridge clip are electrically connected to the cable bus.

20. The method of claim 17, further comprising connecting a measuring device in-line between the cartridge clip and the cable bus clip, wherein the measuring device is configured to measure a current-voltage characteristic at the connection between the conductors electrically connected to mating connectors in the cartridge clip and the cable bus.

21. The photovoltaic structure of claim 1, wherein the cartridge clip is configured to mate to a second cartridge clip of a second photovoltaic cartridge.

22. The photovoltaic structure of claim 1, further comprising:
- a third photovoltaic module comprising a third conductor electrically connected to a third terminal of the first polarity of the third photovoltaic module, the third conductor including a third conductor clip end; and
- a fourth photovoltaic module comprising a fourth conductor electrically connected to a fourth terminal of the first polarity of the fourth photovoltaic module, the fourth conductor including a fourth conductor clip end;
- wherein the cartridge clip further comprises a third mating connector electrically connected to the third conductor clip end, and a fourth mating connector electrically connected to the fourth conductor clip end.

23. The photovoltaic structure of claim 1, wherein the body further comprises a shield provided around the mating connectors.

* * * * *